US009261655B2

(12) United States Patent
Pagot et al.

(10) Patent No.: US 9,261,655 B2
(45) Date of Patent: Feb. 16, 2016

(54) PROTECTION DEVICE FOR AN OPTICAL CONNECTOR COMPRISING A MEMBRANE SEAL

(71) Applicant: SOURIAU, Versailles (FR)

(72) Inventors: Vanessa Pagot, Le Mans (FR); Vincent Metzger, Le Mans (FR); Alain Philippe, Change (FR)

(73) Assignee: SOURIAU, Versailles (FR)

( * ) Notice: Subject to any disclaimer, the term of this patent is extended or adjusted under 35 U.S.C. 154(b) by 0 days.

(21) Appl. No.: 14/672,963

(22) Filed: Mar. 30, 2015

(65) Prior Publication Data

US 2015/0277061 A1    Oct. 1, 2015

(51) Int. Cl.
*G02B 6/38* (2006.01)
*B32B 37/12* (2006.01)
*B32B 37/18* (2006.01)
*H01R 13/52* (2006.01)

(52) U.S. Cl.
CPC .......... *G02B 6/3849* (2013.01); *B32B 37/1284* (2013.01); *B32B 37/18* (2013.01); *G02B 6/3826* (2013.01); *B32B 2551/00* (2013.01); *G02B 6/3825* (2013.01); *H01R 13/5213* (2013.01); *Y10T 156/10* (2015.01)

(58) Field of Classification Search
CPC .................................................... G02B 6/3849
See application file for complete search history.

(56) References Cited

U.S. PATENT DOCUMENTS

| 5,058,983 | A  | 10/1991 | Corke et al. |
| 6,474,490 | B1 | 11/2002 | Seibel et al. |
| 2009/0078671 | A1 | 3/2009 | Triquet et al. |
| 2013/0308909 | A1 | 11/2013 | Barnette, Jr. et al. |

FOREIGN PATENT DOCUMENTS

| EP | 2 045 194 A1 | 4/2009 |
| EP | 2 159 612 A1 | 3/2010 |
| FR | 2 828 021 A3 | 1/2003 |
| GB | 2 378 058 A  | 1/2003 |

*Primary Examiner* — Uyen Chau N Le
*Assistant Examiner* — Chad Smith
(74) *Attorney, Agent, or Firm* — Im IP Law PLLC; C. Andrew Im

(57) ABSTRACT

A connector having a ferrule, and a translucent or transparent covering membrane sealingly bonded with the ferrule by a paste zone and blanking the opening of the connector. The covering membrane being detachable from the ferrule by peeling and having a strip for gripping the membrane during peeling. The covering membrane having a line defining an easy cutting path to prevent its re-installment on the ferrule after its peel off.

7 Claims, 2 Drawing Sheets

PROTECTION DEVICE FOR AN OPTICAL CONNECTOR COMPRISING A MEMBRANE SEAL

RELATED APPLICATION

This application claims priority from French Patent Application No. 14 53905 filed Mar. 29, 2014, which is herein incorporated by reference in its entirety.

FIELD OF THE INVENTION

The invention relates to a protection device with a cover for a connector, in particular an optical connector. The invention is dedicated more particularly, but not exclusively, to the connectivity used in a severe environment, i.e. in an environment subjected to dust, rain, spray, etc, and in which the connector sets must be sealed.

BACKGROUND OF THE INVENTION

A connector set comprises a male connector, and a female connector, each comprising electrical or optical contacts, and intended to couple one with the other to provide an electrical or an optical continuity between the contacts of the male connector and those of the female connector.

With regards to an optical connector, the introduction into the aforementioned connector of a foreign body on the optical contacts is likely to decrease the performances of the connector either by the presence of this foreign body, for example a dust, or by the consequences of its mechanical interaction with the contacts, in particular by scratching According to prior art, for a use in a severe environment, each connector unit is provided with closing caps set up, one on the front face of the male connector, and the other on the front face of the female connector, said caps being intended to protect the contacts. These two caps are removed right before carrying out the coupling of the two connectors. Alternatively or in a complementary way, little caps, also known as individual caps, are also set directly on the contacts and are removed at the time of connection. These various caps do not provide all the required sealing, consequently, dust and moisture are likely to enter inside the male connector or the female connector. Thus, the contacts are systematically cleaned before the coupling, which presents difficulties in a severe environment. Moreover, the aforementioned caps account for a bulk before and after the coupling, since, even if they are attached to the connectors, they require a certain space for their removal and require a specific set up during the coupling.

According to another aspect, more specific to the case of the connectors whose contacts comprise lenses, it is necessary to protect the operator carrying out the installation from any exposure to the optical beam.

SUMMARY OF THE INVENTION

The invention aims at solving the disadvantages of prior art and relates for this purpose to a connector comprising a ferrule and comprising a translucent or transparent covering membrane, sealingly bonded with said ferrule by a paste zone, and blanking the opening of the connector, said membrane being detachable from the ferrule by peeling, and comprising a strip for the gripping of the membrane during peeling, wherein the covering membrane comprises a line defining an easy cutting path, preventing its reinstalment on the ferrule after its peeling off. Thus, the membrane protects the contacts from any intrusion of a foreign body, and is easily removed right before the use of the connector. The membrane being of single use, because of the easy cutting line, the integrity of the membrane is an indicator of first use of the connector and thus of cleanliness of the contacts. The transparency of the membrane allows a visual check of the contacts of the connector without removing said membrane, and more particularly in the case of an optical connector, makes it possible to check the optical continuity of the harness thus connected before carrying out the connection, without exposing the contacts to the environment.

The invention is advantageously implemented according to the embodiments described hereafter which are to be considered individually or according to any technically operative combination.

According to alternate embodiments, the membrane is bonded to the ferrule by gluing or by heat sealing.

Advantageously, the membrane is coated with a tacky substance on all its internal face that closes the ferrule. Thus, this tacky layer traps possible dust lying in the volume of the connector closed by the covering membrane.

Advantageously, the connector of the invention comprises a closing cap suited to cap the ferrule and the membrane. Thus, said cap provides a mechanical protection of the membrane until the use of the connector. Compared to the prior art embodiments, the membrane cover makes it possible to obtain a tight protection even without a sealing seam in the cap or on the ferrule.

The invention also relates to a method for setting up a covering membrane on the end of a connector according to any of the preceding embodiments, said method comprising the steps consisting in:
  I. setting up the membrane in the bottom of the cap;
  II. activating the paste zone of the membrane;
  III. capping the end of the connector with the cap containing the cover.

Thus protected by the cap, the membrane cover is easily set up on the connector, even under tricky handling conditions, for instance when using gloves.

The invention also relates to a cap suited to the ferrule of a connector for the implementation of the method according to the invention said cap comprising:
  a. a shell suited to cooperate with the ferrule of the connector for holding said cap on the end of the connector;
  b. a membrane cover set at the bottom of the cap and comprising an activatable adhesive surface;
  c. means to activate the adhesive surface of the membrane cover whereas said membrane is still into the cap.

Thus, this cap allows the closing of a connector according to IP67 sealing standard by providing a double safety of the closing.

BRIEF DESCRIPTION OF THE DRAWINGS

The invention is hereafter exposed according to its preferred embodiments, in no way restrictive, and in reference to the FIGS. 1 to 7 in which.

DETAILED DESCRIPTION OF THE INVENTION

Figure 1:
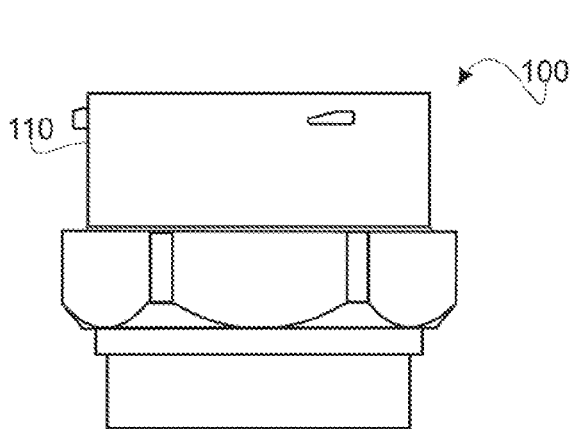
FIG. 1 shows, seen in profile, an exemplary embodiment of a connector according to the invention without a covering membrane.

FIG. 1, according to an exemplary embodiment, the connector (100) of the invention is an optical connector comprising a ferrule (110). The term "ferrule", sometimes designated by "ring", is here taken in its broadest meaning, and indicates that the contacts of the connector are inside a laterally protected volume. The aforementioned connector is indifferently made out of plastic, bronze, aluminium, stainless steel or any other material, and constitutes indifferently a male connector or a female connector. Although the invention is here disclosed according to an embodiment where the connector (100) is an optical connector of appreciably circular section, the person having ordinary skill in the art will adapt the invention to any shape of connector, in particular of rectangular or polygonal section, and with any kind of connection.

Figure 2:
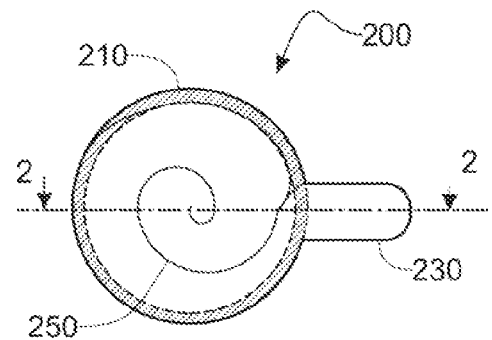
FIG. 2 represents, seen from the front, an exemplary embodiment of a covering membrane suited to the connector of FIG. 1.

FIG. 2, the covering membrane (200) is intended to be placed at the end of the ferrule in order to sealingly close the connector. According to an exemplary embodiment, the aforementioned membrane comprises a paste zone (210) or comprises a layer suitable for heat sealing, corresponding to the circumferential thickness of the end of the ferrule of the connector. According to this exemplary embodiment, this paste zone (210) makes it possible to bond the aforementioned membrane (200) at the end of the connector. A strip (230) with a sufficiently important size to be easily handled with gloves, makes it possible to take off the aforementioned membrane, by peeling, after bonding The membrane (200) cover comprises a line (250) defining an easy cutting path, so that the removal of the membrane from the end of the connector makes the aforementioned membrane non reusable. The preferred cutting line is machined in the membrane according to any method known from the prior art and suited to obtain an oriented tearing without crossing the thickness of the membrane.

Figure 3:
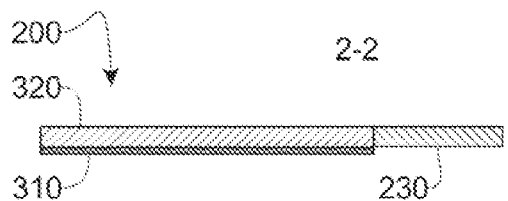
FIG. 3 is a cross-section according to 2-2 defined in FIG. 2 of an exemplary embodiment of the membrane.

FIG. 3, according to an alternate embodiment, the face of the membrane known as the internal face, i.e. the face of the membrane which is turned towards the interior of the connector when the membrane (200) is placed on said connector, is entirely covered with a layer (310) of glue or with a layer suitable for heat sealing. As a nonrestrictive example, the heat sealing layer consists of an amorphous polyethylene terephthalate film (APET) with a thickness of about 30 μm ($30.10^{-6}$ m), co-extruded with a film (320) of poly (ethylene terephthalate) or PET, with a thickness of about 150 μm. According to another embodiment, the adhesive layer consists of a layer of glue. According to alternate embodiments the aforementioned glue is a PSA for "pressure sensitive adhesive" or a hot melt adhesive. The use of a PSA makes it possible to use the internal face (320) of the membrane, said face remaining tacky, to trap the dust that might be inside the part of the connector closed by the membrane. Thus, the aforementioned dust is stuck on this tacky face (320) and does not pollute the contacts.

According to another embodiment the membrane consists of several stratified films, for example, a PET film with a thickness of 100 μm, coated on a face with a permanent acrylic adhesive containing solvent, said film being stuck on another PET film with a thickness of 60 μm with a modified permanent adhesive of polysiloxane, and which carries out the bonding of the membrane on the end of the connector.

As of non-limiting examples, the easy cutting line is obtained by a dotted mechanical pre-cut of a layer stuck on another uncut layer; by ablation or by the creation of a molten line on the easy tear path by means of a laser.

If the internal surface of the membrane is covered with an adhesive layer (320) of the PSA type, said layer is, according to an exemplary embodiment, protected by a thin sheet (not shown), said sheet having to be peeled off in order to exposing the PSA, and thus to activate its bonding capability. If the layer (320) is of the hot melt adhesive type, the activation of the adhesive is obtained by heating the aforementioned layer (320) to the appropriate temperature for triggering its bonding capability Any of these bonding operations is preferably carried out in a clean environment and after cleaning of the contacts.

Figure 4:
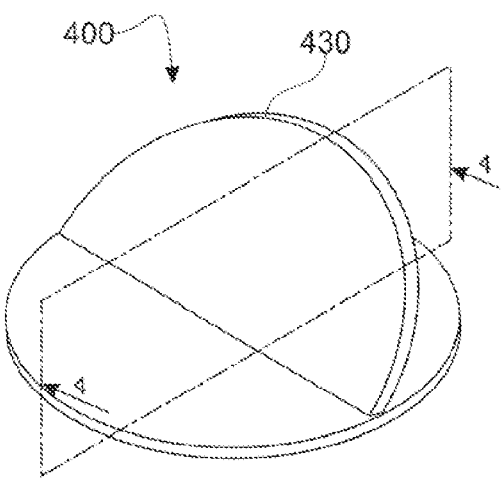
FIG. 4 is a perspective view of another embodiment of a covering membrane suited to a connector according to the invention.

FIG. 4, according to an exemplary embodiment, the membrane (400) comprises a central strip (430) for the peeling of the membrane (400) from the end of the connector.

Figure 5:
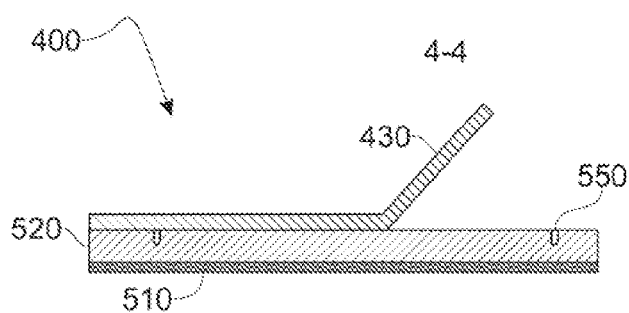
FIG. 5 is a cross-section according to 4-4 of the membrane shown in FIG. 4.

FIG. 5, seen in cross-section, the membrane (400) according to this last embodiment comprises a layer (510) suitable to carry out the bonding of the membrane (400) with the end of the connector, by gluing or heat sealing, laminated with a layer (520) of PET on which a layer making up the strip is bonded. This layer (520) of PET comprises a line (550) making up an easy cutting path, so that the membrane is unusable after peeling The strip is made out of PET or another polymer, for example a polyamide, and is set on the external surface of the membrane by co-extrusion, co-lamination, welding or gluing.

The membrane is transparent or translucent, which makes it possible to check visually the contacts of the connector, and, in particular when the connector is an optical connector, to check the integrity of the optical fibre beam arriving at the connector and their connection with the contacts of the aforesaid connector. Moreover, while offering this possibility of visual check, the membrane protects the eyes of the operator from the exposure to the laser conveyed by the aforementioned optical fibres.

Figure 6:
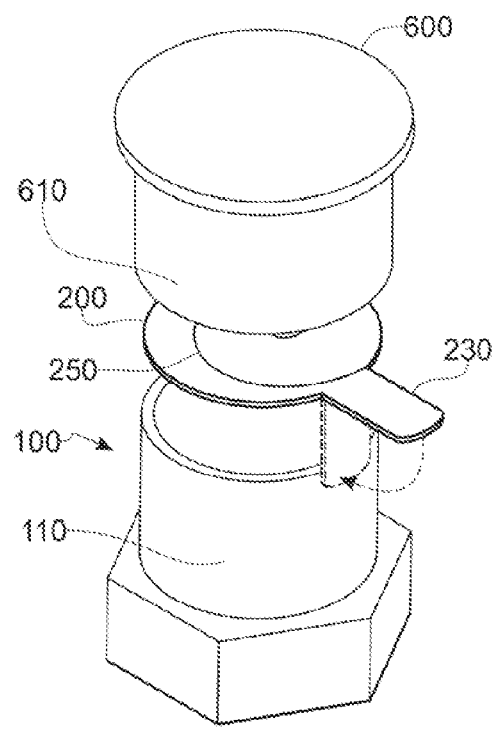
FIG. 6 is an exploded perspective view, of an exemplary embodiment of a cap and its fitting on a connector according the invention.

FIG. 6, the membrane (200) is advantageously combined with a cap (600) suitable to cap the aforementioned membrane (200) and the end of the connector (100). Thus, the aforementioned cap (600) provides a mechanical protection of the end of the connector and of the membrane, the membrane providing the tight closing of the connector. The cap comprises a shell (610) suited to be centered on the ferrule of the connector. According to an embodiment, the membrane (200) is initially bonded at the end of the connector, by gluing or by heat sealing, then, the strip (230) is folded back on the cylindrical external surface of the ferrule, and the cap (600) is slipped on the end of the connector. The strip is then caught between the ferrule (110) and the shell (610) of the cap. According to an exemplary embodiment, the set up of the membrane is carried out in a clean room so as to ensure the cleanliness of the contacts, in particular when these are optical contacts.

Alternatively, the membrane (200) is placed at the bottom of the cap (600) and is set on the end of the connector (600) at the same time as said cap, after having activated the paste zone of the membrane. The activation of the paste zone consists in peeling off the protection sheet, for example when it is a PSA, in heating the cap to an appropriate temperature when it is a hot melt adhesive, or in smearing the end of the connector with one component when it is a dual components adhesive.

Figure 7:
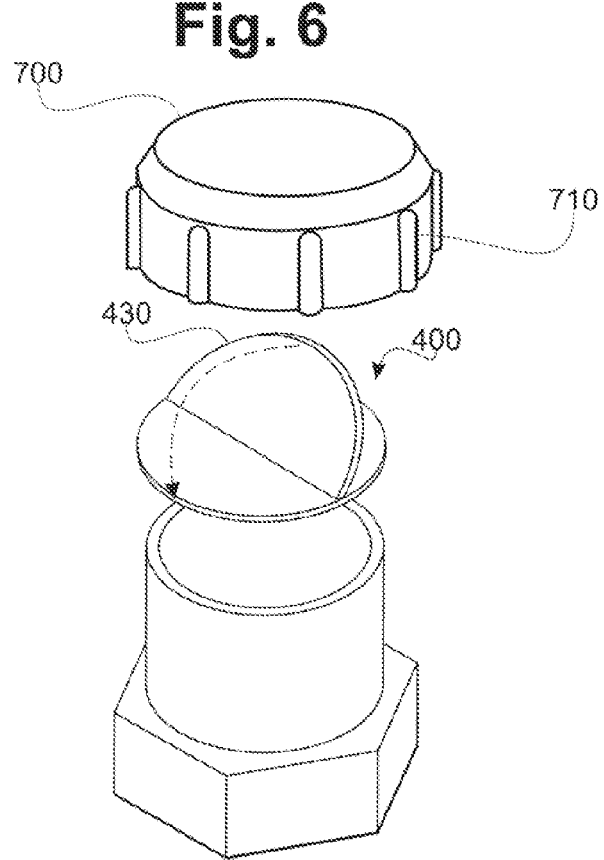
FIG. 7 is an exploded perspective view, of an exemplary embodiment of a cap and its fitting by screwing on the end of a connector.

FIG. 7, according to an alternate embodiment, the cap (700) is suited to be screwed, and comprises a shell (710) comprising an internal thread, suited to cooperate with the threading (not shown) on the cylindrical external surface of the ferrule. In this case the membrane (400) is preferably of the type comprising a central strip (430) so that said strip does not interfere with the threading of the connector during the screwing of the cap (700). According to various embodiments the membrane is either set on the end of the connector before the screwing of the cap, or placed in the bottom of the cap, its paste zone being activated before the fitting of the cap on the end of the connector.

Whatever the type of cap, it eases the handling of the covering membrane, and its set up on the end of the connector without requiring a specific tool.

The foregoing description and the example embodiments show that the invention achieved the pursued goals, in particular it makes it possible to tightly seal the end of a connector, male or female, in an economic way and with a reduced bulk. Moreover, the use of this cover makes it possible to avoid the particularly tricky operations of cleaning of the contacts on the working site.

The invention claimed is:

1. A connector comprising: a ferrule; and a translucent or transparent covering membrane, sealingly bonded with the ferrule by a paste zone and blanking an opening of the connector, the covering membrane being detachable from the ferrule by peeling and comprising a strip for gripping the covering membrane during peeling; and wherein the covering membrane further comprises a line defining a cutting path to prevent re-installment of the covering membrane on the ferrule after its peel off.

2. The connector according to the claim 1, wherein the covering membrane is bonded to the ferrule by gluing.

3. The connector according to the claim 1, wherein the covering membrane is bonded to the ferrule by heat sealing.

4. The connector according to the claim 1, wherein the covering membrane is coated with a tacky substance on all its internal faces that closes the ferrule.

5. The connector according to claim 1, further comprising a closing cap configured to cap the ferrule and the covering membrane.

6. A method for setting a covering membrane on an end of a connector, comprising the steps of:
   setting up the covering membrane at a bottom of a closing cap configured to cap a ferrule of the connector and the covering membrane;
   activating a paste zone of the covering membrane to sealingly bond the covering membrane to the ferrule to blank an opening of the connector, the covering membrane being detachable from the ferrule by peeling and comprising a strip for gripping the covering membrane during peeling and a line defining a cutting path to prevent re-installment of the covering membrane on the ferrule after its peel off; and
   capping the end of the connector with the closing cap comprising the covering membrane.

7. A closing cap configured to cap a ferrule of a connector, comprising:
   a shell configured to cooperate with the ferrule of the connector to hold the closing cap on the end of the connector; and
   a covering membrane set at a bottom of the closing cap and comprising an activatable adhesive surface configured to activate while the covering membrane is still on the closing cap to sealingly bond the covering membrane to the ferrule thereby blanking an opening of the connector, the covering membrane being detachable from the ferrule by peeling and comprising a strip for gripping the covering membrane during peeling and a line defining a cutting path to prevent re-installment of the covering membrane on the ferrule after its peel off.

* * * * *